United States Patent
Moon et al.

(10) Patent No.: US 9,782,755 B2
(45) Date of Patent: Oct. 10, 2017

(54) NICKEL SUPPORTED CATALYST FOR COMBINED STEAM AND CARBON DIOXIDE REFORMING WITH NATURAL GAS

(71) Applicant: KOREA INSTITUTE OF SCIENCE AND TECHNOLOGY, Seoul (KR)

(72) Inventors: Dong Ju Moon, Seoul (KR); Eun Hyeok Yang, Seoul (KR); Gi Hoon Hong, Seoul (KR); Sung Soo Lim, Seoul (KR); Jae Sun Jung, Seoul (KR); Young Su Noh, Seoul (KR); Na Young Kim, Seoul (KR); Jae Suk Lee, Seoul (KR); Ji In Park, Seoul (KR); Sang Yong Lee, Seoul (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 0 days.

(21) Appl. No.: 15/335,163

(22) Filed: Oct. 26, 2016

(65) Prior Publication Data
US 2017/0120225 A1   May 4, 2017

(30) Foreign Application Priority Data

Nov. 4, 2015   (KR) .................. 10-2015-0154353

(51) Int. Cl.
*B01J 23/10* (2006.01)
*B01J 23/755* (2006.01)
(Continued)

(52) U.S. Cl.
CPC ............. *B01J 23/755* (2013.01); *B01J 23/10* (2013.01); *B01J 35/1009* (2013.01); *C01B 3/40* (2013.01);
(Continued)

(58) Field of Classification Search
CPC . B01J 23/10; B01J 23/755; B01J 23/83; B01J 35/1009
See application file for complete search history.

(56) References Cited

U.S. PATENT DOCUMENTS 4,605,675 A * 8/1986 Loev .................... C07C 403/02
514/720
4,605,676 A * 8/1986 Kobylinski ............. B01J 23/75
502/335
(Continued)

FOREIGN PATENT DOCUMENTS

CN   104128187 A   11/2014
KR   10-1363384 B1   2/2014
(Continued)

OTHER PUBLICATIONS

A. Slagtem, Specific Features Concerning the Mechanism of Methane Reforming by Carbon Dioxide over Ni/La2O3 Catalyst, Journal of Catalysis 172, Nov. 30, 1997, pp. 118-126 (1997) Article No. CA971823.

*Primary Examiner* — Cam N. Nguyen
(74) *Attorney, Agent, or Firm* — Goldilocks Zone IP Law

(57) ABSTRACT

A nickel-supported catalyst for combined steam and carbon dioxide reforming, as a catalyst which is used in a process of preparing a synthesis gas by combined steam and carbon dioxide reforming with natural gas, is provided. More particularly, in the nickel-supported catalyst, nickel is supported as an active metal on a lanthanum oxide support.

2 Claims, 3 Drawing Sheets

(51) Int. Cl.
*B01J 23/83* (2006.01)
*B01J 35/10* (2006.01)
*C01B 3/40* (2006.01)

(52) U.S. Cl.
CPC ............ *C01B 2203/0233* (2013.01); *C01B 2203/0238* (2013.01); *C01B 2203/1058* (2013.01); *C01B 2203/1082* (2013.01); *C01B 2203/1241* (2013.01)

(56) References Cited

U.S. PATENT DOCUMENTS

| | | | | |
|---|---|---|---|---|
| 4,729,981 | A * | 3/1988 | Kobylinski | B01J 23/75 502/259 |
| 5,679,614 | A * | 10/1997 | Bangala | B01J 23/866 502/302 |
| 8,506,912 | B1 * | 8/2013 | Hepburn | B01D 53/56 423/213.2 |
| 8,697,028 | B2 * | 4/2014 | Benito Gonzalez | B01J 21/066 252/373 |
| 8,877,673 | B2 * | 11/2014 | Garg | B01J 23/002 423/653 |
| 9,227,185 | B2 * | 1/2016 | Mamedov | B01J 23/002 |
| 9,242,228 | B2 * | 1/2016 | Moon | C01B 3/04 |
| 2002/0042340 | A1 * | 4/2002 | Dunleavy | B01J 23/002 502/303 |
| 2005/0153835 | A1 * | 7/2005 | Uchida | B01J 23/002 502/303 |
| 2007/0191221 | A1 * | 8/2007 | Hussain | B01J 23/002 502/319 |
| 2007/0197377 | A1 * | 8/2007 | Uchida | B01J 23/002 502/302 |

FOREIGN PATENT DOCUMENTS

| | | |
|---|---|---|
| KR | 10-2014-0067676 A | 6/2014 |
| KR | 10-1405517 B1 | 6/2014 |
| KR | 10-2014-0135370 A | 11/2014 |

* cited by examiner

NICKEL SUPPORTED CATALYST FOR COMBINED STEAM AND CARBON DIOXIDE REFORMING WITH NATURAL GAS

CROSS-REFERENCE TO RELATED APPLICATIONS

This application claims, under 35 USB §119, the priority of Korean Patent Application No. 10-2015-0154353, filed on Nov. 4, 2015, in the Korean Intellectual Property Office, the disclosure of which is incorporated herein by reference in its entirety,

BACKGROUND (a) Technical Field

The present invention relates to a nickel-supported catalyst for combined steam and carbon dioxide reforming, more particularly to a nickel-supported catalyst wherein nickel is supported as an active metal on a lanthanum oxide support, as a catalyst which is used in a process of preparing a synthesis gas by combined steam and carbon dioxide reforming with natural gas.

(b) Background Art

A variety of technologies for producing clean fuels are drawing attention due to limitations of fossil fuels and their impact on environmental pollution, Among them, the GTL (gas to liquids) process of preparing a clean synthetic fuel from natural gas is drawing attention. The GTL process consists of a reforming reaction of producing synthesis gas from natural gas and a Fischer-Tropsch synthesis reaction of producing synthetic petroleum from the synthesis gas.

The reforming of methane, which is the principal component of natural gas, can be classified largely into steam reforming of methane (SRM), partial oxidation of methane (POM) using oxygen, carbon dioxide reforming (CDR) of methane, tri-reforming of methane using steam, oxygen and carbon dioxide, etc. The reaction formulas and associated heating values of the reforming reactions are as follows.

Steam reforming of methane (SRM): $CH_4 + H_2O \rightarrow CO + 3H_2$, $\Delta H = 208$ kJ/mol 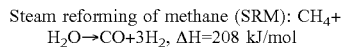

Partial oxidation of methane (POM): $CH_4 + 0.5O_2 \rightarrow CO + 2H_2$, $\Delta H = -38$ kJ/mol 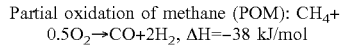

Carbon dioxide reforming of methane (CDR): $CH_4 + CO_2 \rightarrow 2CO + 2H_2$, $\Delta H = 247$ kJ/mol 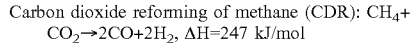

Tri-reforming of methane (TriR): $3CH_4 + H_2O + 0.5O_2 + CO_2 \rightarrow 4CO + 7H_2$, $\Delta H = 417$ kJ/mol 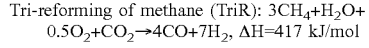

As can be seen from the above reaction formulas, the molar ratio of carbon monoxide to hydrogen in the produced synthesis gas is different for the reforming reactions. In this regard, diverse research has been carried out on the method of preparing synthesis gases with the $H_2/CO$ molar ratio controlled variously from reforming of methane. Among them, combined stream and carbon dioxide reforming (CSCR) of methane using steam and carbon dioxide is drawing a lot of attention.

In combined steam and carbon dioxide reforming (CSCR), the $H_2/CO$ molar ratio in the synthesis gas can be controlled variously from 1 to 3 depending on the composition ratio of the reactants. In addition, combined steam and carbon dioxide reforming is advantageous in that the amount of water to be supplied is smaller than steam reforming, the expensive oxygen plant is unnecessary because oxygen is not consumed during reforming, and the durability of catalyst can be increased as compared to carbon dioxide reforming because carbon deposition on the catalyst is slight. Moreover, because the currently available gas fields contain carbon dioxide in large amounts (5-25%), it is environment-friendly in that carbon dioxide is used as a reactant.

For combined steam and carbon dioxide reforming, nickel-based catalysts are mainly used for commercial purposes. Because carbon deposition and sintering of the active component nickel are known as the main cause of the deactivation of the catalyst used in methane reforming, various research has been carried out in order to improve the stability of the catalyst by preventing such phenomena. In this regard, the inventors of the present invention have developed a nickel catalyst for combined steam and carbon dioxide reforming, which exhibits superior resistance to carbon deposition and thermal stability. For example, patent document 1 discloses a nickel-based catalyst wherein a nickel oxide having a perovskite structure is supported on a $SiC-Al_2O_3$ support formed of silicon carbide and alumina, patent document 2 discloses a nickel-based catalyst wherein nickel is supported on an η-phase alumina support having many acid sites, and patent document 3 discloses a catalyst wherein an alkaline earth metal is co-precipitated in a catalyst having a hydrotalcite-like structure and containing nickel, magnesium and aluminum. Nevertheless, development of new nickel catalysts capable of resolving the deactivation problem is still needed.

REFERENCES OF THE RELATED ART

Patent Documents (Patent document 1) Korean Patent Registration No. 10-1363384, "Perovskite-supported catalyst for combined reforming of natural gas".

(Patent document 2) Korean Patent Registration No. 10-1405517, "Method for manufacturing nickel-based catalyst for combining steam and carbon dioxide reforming".

(Patent document 3) Korean Patent Registration No. 10-1465776, "Alkaline earth metal-co-precipitated nickel-based catalyst used in steam carbon dioxide reforming"

SUMMARY

The present invention is directed to providing a novel nickel-supported catalyst which is applicable to combined steam and carbon dioxide reforming whereby natural gas is reformed using steam and carbon dioxide at the same time.

The present invention is also directed to providing a method for preparing a nickel-supported catalyst for combined steam and carbon dioxide reforming, wherein a nickel metal is supported on a lanthanum oxide support, by calcining metal precursors including a nickel precursor and a lanthanum precursor in the presence of a chelator, wherein nickel ion is reduced to nickel metal by controlling a calcining atmosphere and a lanthanum ion is oxidized to a lanthanum oxide at the same time.

The present invention is also directed to providing a method for preparing a synthesis gas by reforming natural gas with steam and carbon dioxide using the nickel-supported catalyst.

In an aspect, the present invention provides a nickel-supported catalyst wherein a nickel metal is supported on a lanthanum oxide ($La_2O_3$) support, which is used in preparing a synthesis gas by reforming natural gas using steam and carbon dioxide.

In another aspect, the present invention provides a method for preparing a nickel-supported catalyst for combined steam and carbon dioxide reforming, which includes: i) adding a chelating agent to a metal precursor solution containing a nickel precursor and a lanthanum precursor and then adjusting the acidity of the metal precursor solution to pH 4-6; ii) concentrating the acidity-adjusted metal precursor solution; iii) preparing a metal precursor powder by heat-treating the concentrated metal precursor at 300-400° C. under a nitrogen atmosphere; and iv) preparing a nickel-supported catalyst by calcining the metal precursor powder first at 600-900° C. under a nitrogen atmosphere and then calcining second at 850-900° C. under a carbon dioxide atmosphere.

In another aspect, the present invention provides a method for preparing a synthesis gas by reforming natural gas using steam and carbon dioxide in the presence of the nickel-supported catalyst according to the present invention.

The nickel-supported catalyst according to the present invention provides an effect of maintaining a superior catalytic activity by inhibiting carbon deposition and reducing sintering of nickel even under harsh reaction conditions of high temperature and high pressure when used in combined reforming of natural gas using steam and carbon dioxide.

In addition, the nickel-supported catalyst of the present invention provides an effect of controlling carbon deposition because lanthanum oxide ($La_2O_3$) used as a support acts as a carbon remover which quickly removes carbon deposited on the catalyst. That is to say, as described in the following reaction formulas, lanthanum oxide ($La_2O_3$) forms lanthanum dioxide carbonate ($La_2O_2CO_3$) by reacting with carbon dioxide ($CO_2$) used as a reforming agent, and the lanthanum dioxide carbonate forms lanthanum oxide and carbon monoxide by reacting with carbon deposited on the catalyst, thereby controlling carbon deposition.

$$La_2O_3 + CO_2 \rightarrow La_2O_2CO_3$$

$$La_2O_2CO_3 + C \rightarrow La_2O_3 + 2CO$$

In addition, the method for preparing a nickel-supported catalyst according to the present invention provides an effect of inducing uniform dispersion of the nickel active metal in the lanthanum oxide as compared to a catalyst prepared by the conventional impregnation method because the metal precursor powder wherein the nickel precursor used as the active component and the lanthanum precursor used as the support are included together is prepared. In addition, the method for preparing a catalyst of the present invention provides an effect of simplifying the preparation process because the catalyst wherein the nickel metal is supported on the lanthanum oxide support is prepared by reducing nickel ion to nickel metal and at the same time oxidizing lanthanum ion to lanthanum oxide during the calcining of the metal precursor powder and the catalyst pretreatment process of reducing nickel oxide to nickel metal in the existing method for preparing a catalyst is omitted.

In addition, the combined steam and carbon dioxide reforming using the nickel-supported catalyst of the present invention is advantageous in that the prepared synthesis gas has a hydrogen/carbon monoxide ($H_2/CO$) molar ratio of 1.8-2.2 and therefore can be used as a raw material for Fischer-Tropsch synthesis.

DETAILED DESCRIPTION

Figure 1:
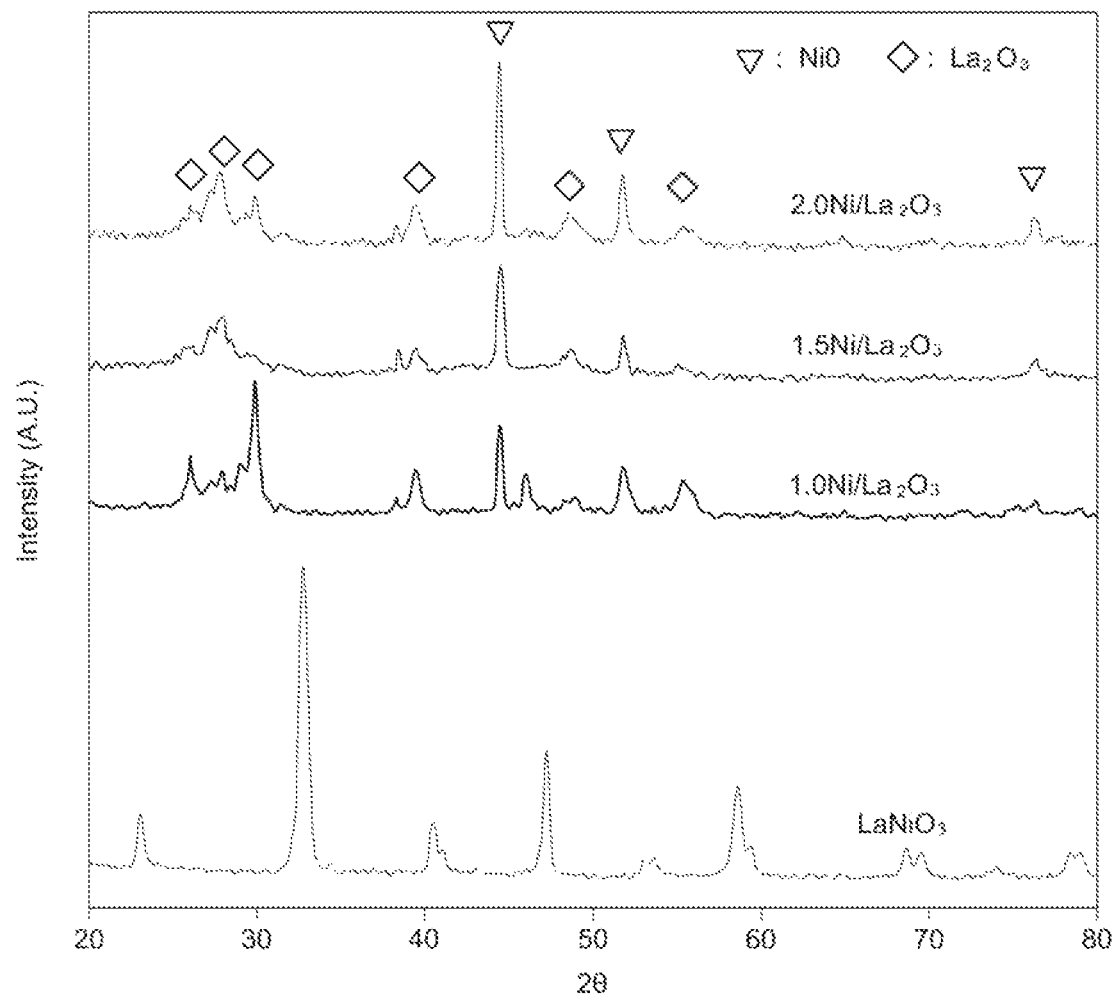
FIG. 1 shows the X-ray diffraction (XRD) pattern of a Ni/$La_2O_3$ catalyst.

The present invention relates to a nickel-supported catalyst wherein nickel metal (Ni) is supported on a lanthanum oxide ($La_2O_3$) support, as a catalyst used in combined reforming of natural gas using steam and carbon dioxide.

As can be seen from Chemical Formula 1, 1-2 mol of nickel metal is supported per 1 mol of lanthanum oxide in the nickel-supported catalyst according to the present invention.

$xNi/yLa_2O_3$           [Chemical Formula 1]

In Chemical Formula 1, x is the moles of nickel metal, y is the moles of lanthanum oxide and the molar ratio of nickel to lanthanum oxide satisfies $1 \leq x/y \leq 2$.

The nickel-supported catalyst according to the present invention has a specific surface area of 3.7-5.2 m²/g. In general, lanthanum oxide ($La_2O_3$) has a very small specific surface area due to large grain size. When nickel is supported on lanthanum oxide having such a small specific surface area by impregnation, it is difficult to uniformly disperse the active metal on the lanthanum oxide support because the active metal is sintered during calcining. In the present invention, the problem originating from the small specific surface area of lanthanum oxide is resolved by preparing a metal precursor powder including a nickel precursor and a lanthanum precursor together. In general, a catalyst used in conventional catalytic reactions requires a pretreatment process for reducing an active metal ion into an active metal before the catalyst is applied to reaction. However, the present invention is advantageous in that an additional pretreatment process for such reduction is unnecessary because nickel ion is reduced to nickel metal during a calcining process for preparing the catalyst.

Accordingly, the present invention provides a method for preparing a nickel-supported catalyst, which includes a metal precursor powder preparation process for uniformly dispersing an active component in a support and a calcining process wherein reduction of the active metal and oxidation of the support occur at the same time.

Specifically, the method for preparing a nickel-supported catalyst according to the present invention includes:

i) a step of adding a chelating agent to a metal precursor solution containing a nickel precursor and a lanthanum precursor and then adjusting the acidity of the metal precursor solution to pH 4-6;

ii) a step of concentrating the acidity-adjusted metal precursor solution;

iii) a step of preparing a metal precursor powder by heat-treating the concentrated metal precursor at 300-400° C. under a nitrogen atmosphere; and iv) a step of preparing a nickel-supported catalyst by calcining the metal precursor powder first at 600-900° C. under a nitrogen atmosphere and then calcining second at 850-900° C. under a carbon dioxide atmosphere.

The steps of the method for preparing a nickel-supported catalyst according to the present invention are described in detail as follows.

In the step i), a metal precursor solution is prepared.

First, a nickel precursor and a lanthanum precursor are dissolved in distilled water. The nickel precursor and the lanthanum precursor are weighed such that the composition ratio of Chemical Formula 1 is satisfied and the precursors are dissolved by stirring for 10 minutes to 1 hour. The nickel precursor or the lanthanum precursor is a compound commonly used when preparing catalysts and is not particularly limited in the present invention. As the metal precursor compounds used in preparing catalysts, one or more of nitrate, acetonate, acetate, halide and acetylacetonate of each metal may be used. More specifically, nitrate may be used.

In the present invention, a chelating agent is included in the metal precursor solution. The chelating agent serves as a redox agent which assists in oxidation of lanthanum and reduction of nickel at the same time. As the chelating agent, one or more selected from a group consisting of ethylenediaminetetraacetic acid (EDTA), nitrilotriacetic acid (NTA), ethylene glycol tetraacetic acid (EGTA), citric acid and oxalic acid may be used. Although EDTA is used mainly in the examples of the present invention, the same effect can be achieved using other chelating agents having amine groups. When EDTA is used as the chelating agent, it may not dissolve well in distilled water. In this case, ammonia water may be added to ionize and dissolve the chelating agent.

Then, the acidity of the metal precursor solution containing the metal precursor and the chelating agent is adjusted to pH 4-6 by adding a base. It is because, when acid salts are used as the metal precursors, the solution has a strongly acidic pH and uniform dispersion of the metal precursors and the chelating agent cannot be achieved because the chelating agent such as EDTA is precipitated as solid. As the base for adjusting the pH, ammonia water, an alkali metal hydroxide, etc. may be used.

If necessary, cellulose powder may be further added as a dispersing agent in order to induce uniform dispersion of the metal precursors and the chelating agent. The cellulose powder may be added in an amount of 20-40 parts by weight based on 100 parts by weight of the metal precursors.

In the step ii), the acidity-adjusted metal precursor solution is concentrated.

When the prepared metal precursor solution is concentrated by heating to 50-100° C., a viscous pale blue concentrate is obtained.

In the step iii), a metal precursor powder is prepared by heat-treating the concentrated metal precursor under a nitrogen atmosphere.

More specifically, the concentrated metal precursor is transferred to a sealed container and heat-treated at 300-400° C. after making the inside of the container a nitrogen atmosphere by sufficiently purging with nitrogen. When heat treatment is conducted under this condition, the blue concentrate swells abruptly and is changed to black powder. Also, during the heat treatment, hydrogen and oxygen are produced as the chelating agent is decomposed. Some of nickel ion is and lanthanum ions are reduced or oxidized by the produced hydrogen and oxygen.

In the step iv), a nickel-supported catalyst, in which nickel metal (Ni) is supported on a lanthanum oxide ($La_2O_3$) support by calcining the metal precursor powder, is prepared.

Specifically, the calcining is accomplished by calcining the metal precursor powder first at 600-900° C. under a nitrogen atmosphere and then calcining second at 850-900° C. under a carbon dioxide atmosphere.

In the present invention, the calcining atmosphere is different in the first calcining and the second calcining. The first calcining is performed under a nitrogen atmosphere for 3-5 hours and the second calcining is performed under a carbon dioxide atmosphere for 1-3 hours. During the first calcining, which is performed under a nitrogen atmosphere, nickel ion is reduced to nickel metal by the hydrogen produced as the chelating agent is decomposed and lanthanum ion is oxidized to lanthanum oxide by the oxygen produced as the chelating agent is decomposed.

The second calcining is performed under a carbon dioxide atmosphere. In the present invention, the chelating agent is used as a redox agent and cellulose is added as a dispersing agent to the metal precursor solution. The chelating agent and/or cellulose may remain in the catalyst as an amorphous carbon species after the heat treatment for concentration and the first calcining. In order to remove the carbon species remaining in the catalyst, the second calcining is performed under a carbon dioxide atmosphere at 850-900° C. During the second calcining, the carbon species is converted to carbon monoxide gas by reacting with carbon dioxide and is removed.

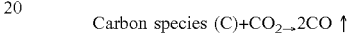

Carbon species (C)+$CO_2 \rightarrow$ 2CO ↑

When the second calcining is performed under an air atmosphere as in usual calcining, the active component nickel metal may be oxidized to nickel oxide and supported or may be supported as a nickel composite metal oxide having a perovskite structure by binding to lanthanum oxide used as the support.

In the present invention, the second calcining is performed at 850-900° C. to remove the carbon species. When the second calcining temperature is maintained below 850° C., it is difficult to completely remove the carbon species because conversion to carbon monoxide is not easy. And, when the second calcining temperature is maintained above 900° C., the activity of the catalyst may decrease due to sintering of nickel.

The catalyst prepared through this method is a nickel-supported catalyst wherein nickel metal (Ni) is supported on a lanthanum oxide ($La_2O_3$) support. The prepared $Ni/La_2O_3$ catalyst has a specific surface area of 3.7-5.2 $m^2/g$.

The present invention also provides a method for preparing a synthesis gas by reforming natural gas using steam and carbon dioxide in the presence of the nickel-supported catalyst.

As described above, in the existing method for preparing a catalyst, a pretreatment process of reducing a nickel oxide-supported catalyst is conducted before using the same in a catalytic reaction. The catalyst provided by the present invention is advantageous in that the pretreatment process for reduction is not necessary because the catalyst provided in the present invention is a catalyst wherein nickel metal (Ni) is supported on a lanthanum oxide ($La_2O_3$) support. That is to say, the nickel-supported catalyst prepared through calcining according to the present invention can be used immediately in a reactor for combined steam and carbon dioxide reforming. The reactor may be, for example, a tubular fixed-bed catalytic reactor.

The natural gas used in combined steam and carbon dioxide reforming in the present invention consists mainly of methane. In a specific exemplary embodiment of the present invention, as reactants, methane, steam and carbon dioxide for preparing a synthesis gas through combined steam and carbon dioxide reforming may be injected into a reactor by controlling their molar ratio to be 1:1-2:0-1. Specifically, a synthesis gas may be prepared with a superior conversation rate when the reactants are injected under the condition of a reaction pressure of 20-30 bar, more specifically 21-23 bar, a reaction temperature of 800-900° C. and a space velocity of 3,000-10,000 h$^{-1}$ and then the reaction is performed for 12-36 hours. Because the synthesis gas prepared by performing reforming under the above-described condition has a hydrogen/carbon monoxide ($H_2$/CO) molar ratio of 1.8-2.2, it can be use as a raw material for Fischer-Tropsch sybthesis.

EXAMPLES

The present invention will be described in more detail through examples. The following examples are for illustrative purposes only and it will be apparent to those skilled in the art that the scope of this invention is not limited by the examples.

Example 1

Preparation of 1Ni/$La_2O_3$ Catalyst

A metal precursor solution was prepared by adding 2.225 g of nickel nitrate and 3.314 g of lanthanum nitrate to 50 mL of distilled water and stirring for 1 hour. In a separate container, 20 mL of distilled water and 5.26 g of ethylenediaminetetraacetic acid (EDTA) were added and, after stirring, the EDTA was dissolved by adding 4 mL of ammonia water ($NH_4OH$). After adding the EDTA solution to the metal precursor solution, the solution pH was adjusted to 5 by further adding ammonia water ($NH_4OH$). In addition, 1.5 g of cellulose powder was added to induce uniform dispersion of the metal precursors and the EDTA. After the cellulose was added, the metal precursor solution was immediately heated to 90° C. and concentrated. The concentrated metal precursor appeared to be blue caramel. The concentrated metal precursor was transferred to a glass bottle and, after flowing nitrogen for 30 minutes, the temperature inside the glass bottle with a nitrogen atmosphere was increased to 350° C. Through the heat treatment under a nitrogen atmosphere, the concentrated metal precursor swelled rapidly and turned into black powder as the water contained in the metal precursor was evaporated completely. The metal precursor powder obtained through the heat treatment was calcined first under a nitrogen atmosphere at 850° C. for 5 hours and then calcined second under a carbon dioxide atmosphere at 850° C. for 2 hours. For the calcining, a heating rate was maintained at 5° C./min. The specific surface area of the prepared nickel-supported catalyst was 3.7 m$^2$/g.

Example 2

Preparation of 1.5Ni/$La_2O_3$ Catalyst

A catalyst was prepared in the same manner as in Example 1, using 3.338 g of nickel nitrate and 3.314 g of lanthanum nitrate when preparing the metal precursor solution. The amount of EDTA was 6.58 g. The specific surface area of the prepared nickel-supported catalyst was 4.1 m$^2$/g.

Example 3

Preparation of 2Ni/$La_2O_3$ Catalyst

A catalyst was prepared in the same manner as in Example 1, using 4.45 g of nickel nitrate and 3.314 g of lanthanum nitrate when preparing the metal precursor solution. The amount of EDTA was 7.89 g. The specific surface area of the prepared nickel-supported catalyst was 5.2 m$^2$/g.

Comparative Example 1

Preparation of $LaNiO_3$ Catalyst

A concentrated metal precursor was prepared in the same manner as in Example 1. Then, the concentrated metal precursor was transferred to a glass bottle and, after flowing air for 30 minutes, the temperature inside the glass bottle with an air atmosphere was increased to 350° C. Through the heat treatment under an air atmosphere, the concentrated metal precursor swelled rapidly and turned into black powder as the water contained in the metal precursor was evaporated completely. Unlike under a nitrogen atmosphere, the swelling occurred with flames due to rapid oxidation by oxygen contained in the air. The metal precursor powder obtained through the heat treatment was calcined under an air atmosphere at 850° C. for 5 hours. For the calcining, a heating rate was maintained at 5° C./min. The specific surface area of the prepared nickel-supported catalyst was 2.6 m$^2$/g.

Experimental Example 1

Comparison of XRD Patterns of Catalysts

XRD analysis was conducted for the catalysts prepared in Examples 1-3 and Comparative Example 1 in order to see whether the active component nickel is present as a reduced metal species.

As seen from the XRD patterns shown in FIG. 1, the peaks of nickel metal species are clearly observed for the catalysts prepared in Examples 1-3. It can be seen that the peak intensity of the nickel metal species increases as a nickel content increases. In contrast, the peak of nickel metal species could not be observed for the catalyst prepared in Comparative Example 1.

Experimental Example 2

Comparison of Catalytic Activity

The catalytic activity of the catalysts prepared in Examples 1-3 and Comparative Example 1 for combined steam and carbon dioxide reforming was compared.

Each catalyst was immediately filled in a reforming reactor without pretreatment for reduction. Nitrogen was flown into the catalyst-filled reactor to remove air remaining in the reactor. Combined steam and carbon dioxide reforming was preformed under the condition of a reaction temperature of 900° C., a reaction pressure of 21 bar and a space velocity of 10,000 h$^{-1}$ for 24 hours. Reactants were fixed with a methane/water/carbon dioxide molar ratio=1/1.5/0.7. Among the reactants, the gases were injected into the reactor using a mass flow controller and water was supplied to the reactor after being injected into a vaporizer by an HPLC pump and then being vaporized to stream. Before and after the reaction, the composition of the gases was analyzed on-line using a gas chromatography system directly connected to the reactor. A Carbosphere column was used for separation of the gases and a thermal conductivity detector was used to analyze the gases.

The result of performing combined steam and carbon dioxide reforming of methane in the presence of each catalyst is shown in Table 1. In Table 1, average values during 24 hours of combined steam and carbon dioxide reforming are shown.

TABLE 1

| Catalyst | Surface area (m²/g) | Reaction temperature (°C.) | Conversion rate (%) CH$_4$ | Conversion rate (%) CO$_2$ | H$_2$/CO molar ratio |
|---|---|---|---|---|---|
| Example 1 (1Ni/La$_2$O$_3$) | 3.7 | 900 | 84.1 | 43.6 | 1.97 |
| Example 2 (1.5Ni/La$_2$O$_3$) | 4.1 | 900 | 81.5 | 40.1 | 2.02 |
| Example 3 (2Ni/La$_2$O$_3$) | 5.2 | 900 | 81.2 | 38.6 | 2.06 |
| Comparative Example 1 (LaNiO$_3$) | 2.6 | 900 | 55.6 | 45.5 | 1.61 |

Figure 2:
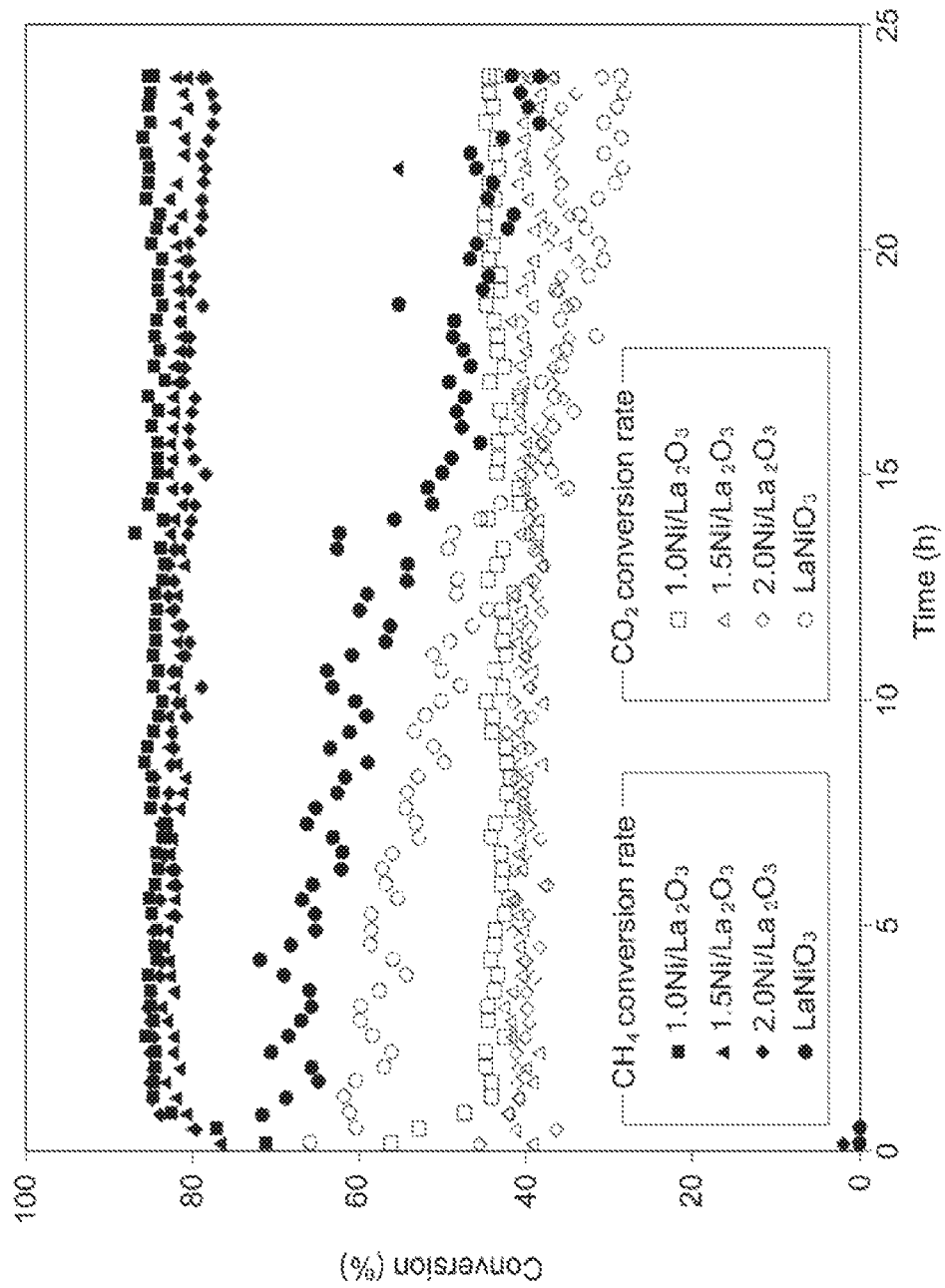
FIG. 2 shows a result of conducting combined steam and carbon dioxide reforming in the presence of catalysts prepared in Examples 1-3 and Comparative Example 1. The conversion rate of methane or carbon dioxide is shown.

As seen from Table 1, the Ni/La$_2$O$_3$ catalysts prepared in Examples 1-3 showed superior methane conversion rates of 81.2-84.1%, whereas the LaNiO$_3$ catalyst prepared in Comparative Example 1 showed a low conversion rate of 55.6%. The carbon dioxide conversion rate of the catalyst of Comparative Example 1 described in Table 1 seems to be higher than those of the catalysts Examples 1-3 since average values are described. However, the values are average values and, from FIG. 2, it can be seen that the carbon dioxide conversion rate of the catalyst of Comparative Example 1 was initially high but the methane and carbon dioxide conversion rates decreased rapidly with time. That is to say, whereas the catalysts prepared in Examples 1-3 maintained stable catalytic activity during the catalytic reaction, the catalyst of Comparative Example 1 showed unstable catalytic activity.

In addition, because the synthesis gases prepared using the catalysts prepared in Examples 1-3 had a hydrogen/carbon monoxide (H$_2$/CO) molar ratio close to 2, they can be used as raw materials for Fischer-Tropsch synthesis.

Experimental Example 3

Comparison of Carbon Deposition

Thermogravimetric analysis was conducted for the catalysts prepared in Examples 1-3 and Comparative Example 1 in order to see carbon deposition behavior.

Figure 3:
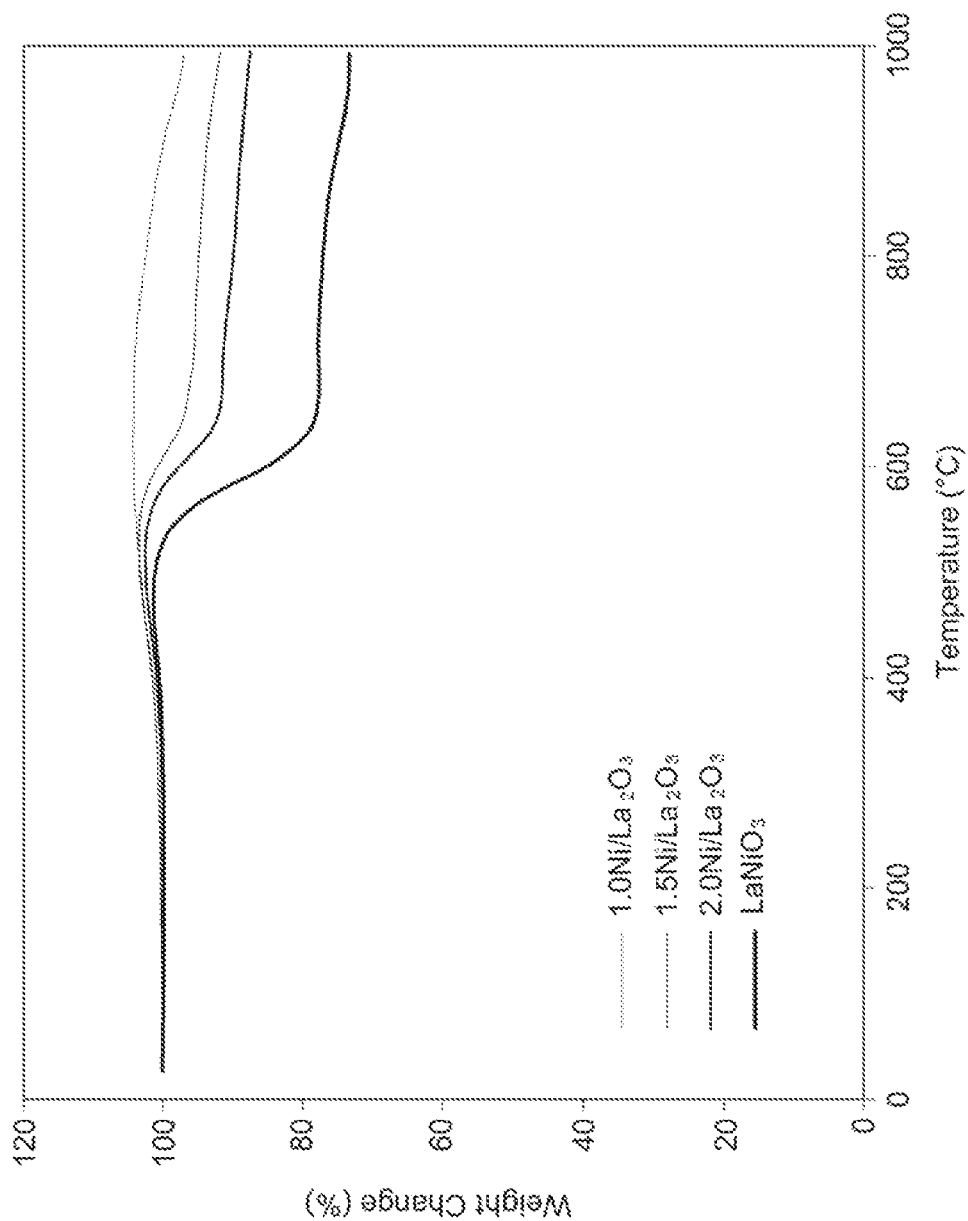
FIG. 3 shows a result of thermogravimetric analysis of catalysts used in combined steam and carbon dioxide reforming.

As seen from FIG. 3, the catalysts prepared in Examples 1-3 showed good resistance to carbon deposition.

The nickel-supported catalyst according to the present invention can simplify a catalytic process and lower processing cost because it does not require a pretreatment process for reduction. In addition, it can ensure superior catalytic activity and thermal stability even when it is used in combined steam and carbon dioxide reforming conducted under harsh conditions of high temperature and high pressure.

What is claimed is:

1. A nickel-supported catalyst wherein a nickel metal is supported on a lanthanum oxide (La$_2$O$_3$) support, which is used in preparing a synthesis gas by combined steam and carbon dioxide reforming with natural gas,
   wherein the catalyst has a specific surface area of 3.7-5.2 m²/g.

2. The nickel-supported catalyst according to claim 1, which has a composition ratio according to Chemical Formula 1:

$x$Ni/$y$La$_2$O$_3$          [Chemical Formula 1]

wherein x is moles of the nickel metal, y is moles of the lanthanum oxide and a molar ratio of nickel to lanthanum oxide satisfies 1≤x/y≤2.

\* \* \* \* \*